Jan. 10, 1967 B. W. WIGGS 3,297,267

TAPE DECKS

Filed Feb. 12, 1965

INVENTOR
Bryan William Wiggs
BY
Smith, Michael, Bradford + Gardiner
ATTORNEYS

United States Patent Office 3,297,267
Patented Jan. 10, 1967

3,297,267
TAPE DECKS
Bryan W. Wiggs, London, England, assignor to Elliott Brothers (London) Limited, Lewisham, London, England, a British company
Filed Feb. 12, 1965, Ser. No. 432,342
Claims priority, application Great Britain, Feb. 13, 1964, 6,003/64
6 Claims. (Cl. 242—55.13)

This invention relates to a tape deck for magnetic recording tape and adapted to form part of tape transducing apparatus, that is to say tape recording apparatus or tape reproducing apparatus or tape recording and reproducing apparatus.

According to the present invention, there is provided a tape deck for magnetic recording tape transducing apparatus, having a transducing head and means defining a guide path for a tape leader, which guide path extends past said transducing head but is spaced therefrom.

The present invention also provides a tape deck for magnetic tape transducing apparatus, having at least one transducing head, a capstan, and means defining a guide path for a tape leader, which guide path extends past the transducing head or heads and said capstan, but is spaced therefrom.

The present invention further provides a tape deck, for use in combination with a magnetic recording tape having a leader which is both wider and stiffer than the tape, the tape deck having at least one transducing head and a capstan, and means for engaging the edges of the leader and defining a guide path for said leader which extends past said head or said capstan, or both said head and said capstan, but is spaced therefrom.

One embodiment of a tape deck in accordance with the present invention is shown in the accompanying drawings, in which.

Figure 1:
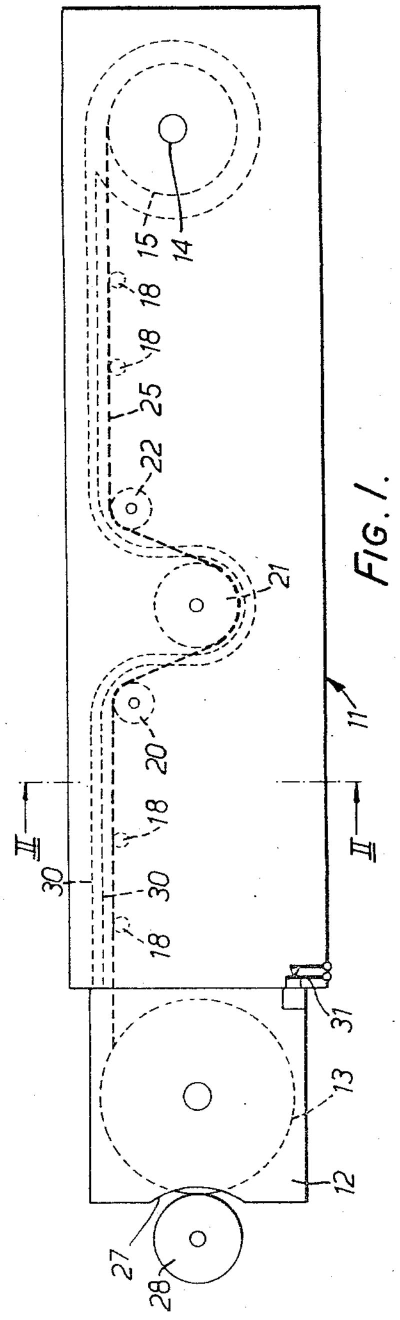
FIG. 1 is a plan view of the tape deck.
Figure 3:
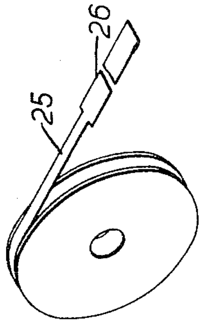
FIG. 3 is a perspective view of a tape spool, having a leader, for use with the tape deck.
Figure 2:
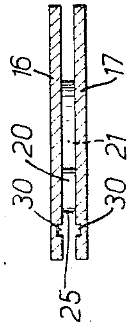
FIG. 2 is a section on the line II—II of FIG. 1.

FIG. 1 of the drawing shows the tape deck of an automatic data recorder, although the tape deck is applicable to other forms of tape transducing apparatus.

The tape deck 11 comprises a cartridge 12 containing a tape feed spool 13, a support 14 for a tape take-up spool 15, and two parallel plates 16, 17, spaced apart by a distance equal to or slightly greater than the width of the tape, disposed between the two spools and restraining the tape against lateral movement. A guide path for the tape is defined by guide posts 18 forming spacers between the plates 16, 17, a first transducing head 20 (in particular a recording head), a capstan 21 and a second transducing head 22 (in particular a reproducing head). This system can also include an erase head (not shown).

The tape 25, which this apparatus is designed to use, has a leader 26 which is sufficiently stiff to permit it to be pushed along the guide path between the feed spool 13 and the take-up spool 15. This leader, which is sufficiently long to extend over the full length of this guide path, is wider than the tape, so that when wound on the feed spool, it overlaps the edges of the spool. The drive for the feed spool 13 is provided by a drive wheel 28 which projects through a slot 27 in the side of the cartridge 12 and upon rotation, rotates the spool 13. The leader 26, which is pressed between the drive wheel 28 and the periphery of the spool 13, is urged out of the cartridge through an outlet slot.

The guide path for the leader is provided by two opposite parallel slots 30 formed in the adjacent surfaces of the two plates 16, 17. This leader guide path extends alongside the tape path but is spaced therefrom over a major part of its length, and in particular over that part of its length extending past the transducing heads 20, 22 and the capstan 21. In this way contact between the leader and these components is avoided, thus preventing abrasion of these components and the deposition of foreign matter thereon.

In order to prevent inadvertent overwriting of data on the tape, an interlock-switch 31 is disposed on the tape deck adjacent the tape cartridge 12 and is operated by securing the cartridge to the tape deck.

I claim:

1. In a tape deck for use in combination with a magnetic recording tape having a leader which is stiffer and wider than the tape,
- a pair of elongate members each having a surface facing but parallel spaced from the corresponding surface of the other member,
- tape guides extending between said surfaces and defining a guide path for the tape, the guide path being bounded laterally by said surfaces
- each said elongate member having a slot therein disposed opposite the corresponding slot of the other member for engaging an edge of said leader and defining a guide a path for said leader, said slots being spaced from said tape guides to space the guide path for the leader from the guide path for the tape over at least part of the length of the latter.

2. A tape deck according to claim 1 wherein said members are parallel-spaced plates.

3. A tape deck according to claim 1 having a tape feed spool and a tape take-up spool, wherein the slots defining said guide path for the leader extend over substantially the whole distance between the two said spools.

4. A tape deck according to claim 1 having a transducing head, wherein the leader guide path defined by said slots is spaced from said head.

5. A tape deck according to claim 1 having a capstan, wherein the leader guide path defined by said slots in spaced from said capstan.

6. In a tape deck for use in combination with a recording tape having a leader which is stiffer and wider than the body of the tape,
- two elongate members each having a surface facing but spaced from, the corresponding surface of the other elongate member,
- guide means extending between said surfaces of the elongate members and defining a guide path for the tape, the guide path being bounded laterally by said surfaces,
- each said elongate member having an elongate opening therein disposed opposite the corresponding elongate opening of the other member, said openings serving to engage an edge of the leader and defining a guide path for the leader, and said openings being spaced from said guide means so that the guide path for the leader is spaced from the guide path for the tape over at least part of the length of the tape.

References Cited by the Examiner

UNITED STATES PATENTS 3,208,682 9/1965 Pastor et al. ------ 242—55.12

FRANK J. COHEN, *Primary Examiner.*

LEONARD D. CHRISTIAN, *Examiner.*